Jan. 22, 1924.　　　　　　　　　　　　　　　　1,481,290
H. JUNKERS
RIVETING DEVICE
Filed July 11, 1921

Inventor
Hugo Junkers
by
Atty.

Patented Jan. 22, 1924.

1,481,290

UNITED STATES PATENT OFFICE.

HUGO JUNKERS, OF DESSAU, GERMANY.

RIVETING DEVICE.

Application filed July 11, 1921. Serial No. 483,852.

*To all whom it may concern:*

Be it known that I, HUGO JUNKERS, a citizen of the German Empire, residing at Dessau, Germany, have invented certain new and useful Improvements in Riveting Devices (for which I have filed application in Germany, January 28, 1918, Patent No. 323,236; Holland, July 4, 1919, Patent No. 7,150; Sweden, December 6, 1919, Patent No. 49,534; Denmark, December 19, 1919, Patent No. 29,951; Norway, December 31, 1919, Patent No. 32,386), of which the following is a specification.

My invention relates to mechanism for making rivet connections in the walls of hollow bodies, and more especially tubular bodies such as the long narrow metal tubes used in the construction of flying machines and whose interior is not easily accessible.

My invention tends to obviate the drawbacks connected with the methods practised up till now of inserting the rivets from the interior of the work piece and it renders it possible to form the closing head in long and narrow tubes from the interior after inserting the rivet in its hole from the outside, whereby the riveting operation is materially simplified and shortened.

The method of forming the closing head within the interior of a tube or other hollow body according to my invention substantially consists in forcing the rivet introduced from the outside into the rivet hole by blows or pressure acting upon the rivet head, against an abutment or anvil previously introduced into the said tube or other body, while at the same time gradually diminishing the distance between the abutment and the wall receiving the rivet in proportion to the progressive reduction in length of the rivet stem.

That end of the rivet stem which projects into the interior of the tube or other hollow body is upset by the pressure constantly exerted by the abutment on the one hand and the hammer or the like on the other hand, until a closing head firmly applied against the inner wall of said tube or other hollow body has been formed.

My invention relates to devices adapted for performing this method, these devices being constructed in such a manner that the distance between the face of the abutment in contact with the end of the rivet stem and the place of riveting can be gradually diminished in proportion to the progressive reduction in length of the rivet stem forming the closing head. This may be effected by turning an eccentric abutment or an auxiliary device connected therewith.

In the drawings affixed to this specification and forming part thereof different modifications of riveting devices embodying my invention are illustrated diagrammatically. In the drawings—

Fig. 6 shows on the left the parts in operative position at the beginning of the riveting operation, and on the right the implements for turning and holding, respectively, the two parts of the abutment.

Figure 1:
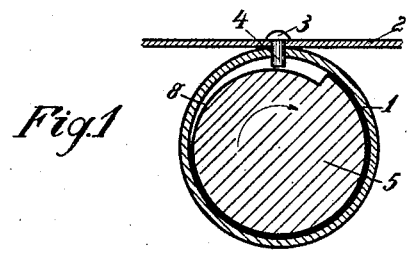
Fig. 1 is a cross-section of an eccentric abutment which is rotated in a predetermined direction during the riveting operation.

Referring to the drawings 1 is the hollow work piece such as a tube, and 2 is a plate to be connected thereto by riveting, 3 is the rivet head, 4 is the stem of the rivet, 5 is the abutment or anvil.

The cylindrical abutment according to Fig. 1 has a spiral face 8 formed thereon and is turned during the riveting operation in the direction of the arrow, whereby the distance between the abutment and the wall of the tube is gradually diminished in proportion to the progressive shortening of the rivet.

Figure 2:
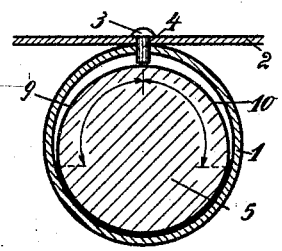
Fig. 2 is a cross-section of an eccentric abutment adapted to be rotated in any desired direction during the riveting operation.

The cylindrical abutment according to Fig. 2 has two spiral faces 9 and 10 meeting in a point nearest the center. By turning the abutment in one or the other direction the distance between one or the other of said faces and the rivet head is diminished.

Figure 3:
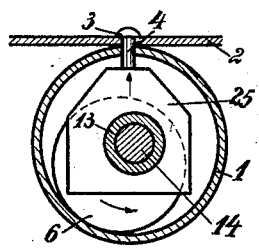
Fig. 3 is a cross-section of a two-part device, in which one part is rotated and thereby imparts to the other part a vertical movement in the direction of the rivet.

In the embodiment of my invention shown in Fig. 3 the riveting appliance consists of two parts, the anvil 25 and the abutment 6 bearing against the wall of the tube.

Figure 6:
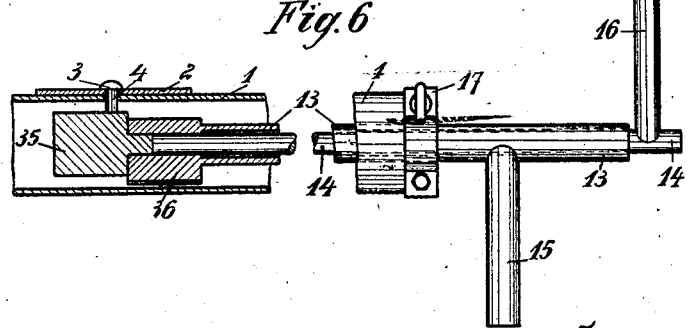

The anvil is prevented from rotating or turning, while the abutment 6 is pivoted eccentrically to the anvil 25 and is turned in the direction of the arrow during the riveting operation, whereby the anvil 5 is displaced vertically in the direction of the rivet. 13 is a tube extending outwards and serving to lock the anvil against rotation, while the abutment 6 is fixed to and turned by aid of a rod 14 extending through said tube, as shown in detail in Fig. 6.

Figure 4:
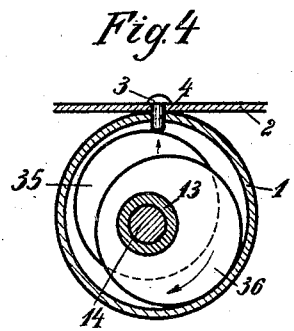
Figs. 4, 5 and 6 are cross-sections and a longitudinal section, respectively (the latter on a reduced scale), of a device, the two parts of which are rotated relatively to each other during the riveting operation.
Figure 5:
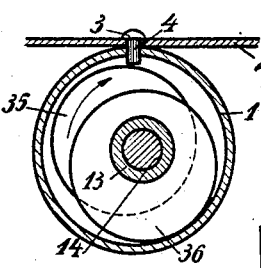

The tool according to Figs. 4, 5 and 6 also consists of two principal parts, the anvil 35 and the abutment 36 supported on the wall of the tube, both parts being eccentrically pivoted to each other. If the initial position of the two parts is the one illustrated in Fig. 4, the anvil 35 being prevented from rotating, part 36 may be turned in the direction of the arrow and the anvil 35 will then be advanced vertically towards the rivet, in the same manner as in the case illustrated in Fig. 3.

In the case, however, where the initial position of the eccentrics is as shown in Fig. 5, part 36 may be locked against rotation and part 35 may now be turned in the direction of the arrow, whereby an effect similar to that illustrated in Figs. 1 or 2 is obtained.

It is, however, possible also to cause both parts 35 and 36 to be rotated simultaneously during the riveting operation.

The parts 35 and 36 may be exchanged if desired, part 35 then serving as abutment and part 36 as anvil.

For the purpose of preventing or producing a rotating movement of each individual part, part 36 is rigidly fixed to a tube 13 and part 35 is rigidly attached to a rod 14, extending through said tube 13. The tube 13 and the rod 14 are both provided with handles 15 and 16, which permit of holding, locking or rotating parts 35 and 36, as may be desired. The sleeve 17 clamped upon the tube 13, serves as a stop limiting the longitudinal displacing of the anvil 35 within the tube so that it will lie substantially below the rivet.

I claim:

1. A riveting device for hollow bodies comprising a cam faced anvil and means for gradually displacing said anvil within the hollow body in contact with the rivet stem and with the opposite wall of said body so as to enlarge the distance between the point of contact of the cam face with the rivet and said wall.

2. A riveting device for hollow bodies comprising a cam-shaped anvil adapted to abut against the inner wall of the hollow body and to be displaced transversely to the rivet.

3. A tube riveting device comprising in combination, a cam-shaped anvil of substantially cylindrical section fitting in the tube to be riveted and adapted to abut against the inner wall of the tube and means for turning said anvil within said tube about the axis of its cylindrical portion.

4. A tube riveting device comprising in combination an anvil and an abutment pivoted to said anvil, the largest diameter of the combined anvil and abutment being at least equal to the diameter of the tube to be riveted and means for turning one part relatively to the other.

5. A tube riveting device comprising in combination two substantially cylindrical abutments pivoted to each other eccentrically, the largest diameter of the combined abutments being at least equal to the diameter of the tube to be riveted, and means for turning one part relatively to the other.

In testimony whereof I affix my signature.

HUGO JUNKERS.